(12) United States Patent  (10) Patent No.: US 8,591,115 B2
Mori                      (45) Date of Patent: Nov. 26, 2013

(54) ROLLING BEARING DEVICE (75) Inventor: Tatsuki Mori, Toyota (JP)

(73) Assignee: JTEKT Corporation, Osaka (JP)

( * ) Notice: Subject to any disclaimer, the term of this patent is extended or adjusted under 35 U.S.C. 154(b) by 664 days.

(21) Appl. No.: 12/591,677

(22) Filed: Nov. 27, 2009

(65) Prior Publication Data

US 2010/0142875 A1  Jun. 10, 2010

(30) Foreign Application Priority Data

Dec. 4, 2008  (JP) ................. 2008-309633
Oct. 28, 2009 (JP) ................. 2009-247324

(51) Int. Cl.
F16C 19/00 (2006.01)

(52) U.S. Cl.
USPC ........................................... 384/475

(58) Field of Classification Search
USPC ................. 384/462, 475, 625, 474
See application file for complete search history.

(56) References Cited

U.S. PATENT DOCUMENTS

| | | | |
|---|---|---|---|
| 3,161,448 A * | 12/1964 | Moran ............. | 384/475 |
| 3,645,592 A | 2/1972 | Flandrena | |
| 4,111,501 A | 9/1978 | Johnston et al. | |
| 4,623,268 A | 11/1986 | Pollastro | |
| 6,323,640 B1 | 11/2001 | Forestiero et al. | |
| 6,896,416 B2 * | 5/2005 | Matsuzaki ............. | 384/625 |
| 2002/0090157 A1 | 7/2002 | Matsuzaki | |
| 2004/0131293 A1 | 7/2004 | Matsuzaki | |
| 2008/0159677 A1 | 7/2008 | Langer et al. | |

FOREIGN PATENT DOCUMENTS

| | | |
|---|---|---|
| DE | 10 2005 018 616 A1 | 10/2006 |
| EP | 0 930 505 A1 | 7/1999 |
| JP | A-U51-132449 | 10/1976 |
| JP | A-H11-108068 | 4/1999 |
| JP | A-2002-122149 | 4/2002 |
| JP | A-2004-116715 | 4/2004 |
| JP | A-2005-090658 | 4/2005 |
| JP | A-2006-57686 | 3/2006 |
| JP | A-2006-316875 | 11/2006 |
| JP | A-2008-115955 | 5/2008 |
| JP | A-2008-121840 | 5/2008 |
| JP | A-2008-144813 | 6/2008 |
| JP | A-2008-240826 | 10/2008 |
| WO | WO 2006/092121 A1 | 9/2006 |
| WO | WO 2008/056445 A1 | 5/2008 |

OTHER PUBLICATIONS

Jan. 28, 2013 Office Action issued in Chinese Patent Application No. 200910224393.3 (with translation).

(Continued)

Primary Examiner — Phillip A Johnson
(74) Attorney, Agent, or Firm — Oliff & Berridge, PLC (57) ABSTRACT A rolling bearing device includes: an outer ring that has outer ring raceway grooves formed on an inner peripheral surface of the outer ring and a counter bore portion that is provided on an outer side of the outer ring raceway grooves in an axial direction; an inner ring member that has inner ring raceway grooves formed on an outer peripheral surface of the inner ring member; and a plurality of rolling elements that are interposed between the outer ring raceway grooves and the inner ring raceway grooves so as to freely roll and that are in contact with the inner ring raceway grooves of the inner ring member and the outer ring raceway grooves of the outer ring at a predetermined contact angle. A lubricant reservoir portion that stores lubricant is formed at a portion in the outer ring raceway grooves adjacent to the counter bore portion.

4 Claims, 5 Drawing Sheets (56) References Cited

OTHER PUBLICATIONS

Jul. 10, 2013 Office Action issued in Japanese Patent Application No. 2009-247324 (with translation).

Aug. 21, 2013 Search Report issued in European Patent Application No. 09177894.4.
Sep. 9, 2013 Office Action issued in Japanese Patent Application No. 2009-247324 (with translation).

* cited by examiner

ROLLING BEARING DEVICE

INCORPORATION BY REFERENCE

The disclosure of Japanese Patent Applications No. 2008-309633 filed on Dec. 4, 2008 and No. 2009-247324 filed on Oct. 28, 2009 including the specifications, drawings and abstracts are incorporated herein by reference in their entirety.

BACKGROUND OF THE INVENTION

1. Field of the Invention

The invention relates to a rolling bearing device used in a vehicle, such as an automobile.

2. Description of the Related Art

A rolling bearing device is used in a vehicle, such as an automobile, in order to install a tire wheel or a brake disk. A known rolling bearing device includes an inner ring that is integrally rotatably provided on an axle and that fixes a tire wheel or a brake disk and an outer ring that is located on a radially outer side of the inner ring and that is non-rotatably fixed to a vehicle body side via rolling elements (Japanese Patent Application Publication No. 2006-57686 (JP-A-2006-57686)).

Then, in recent years, the service life of a vehicle is getting longer and longer and, for this reason, the durability of components used in the vehicle also needs to be improved. For example, in the above described rolling bearing device, in order to avoid exhaustion of filled grease due to long-term usage, a grease reservoir is provided in space between rolling elements that constitute a double row angular bearing and that are located at both sides in the axial direction. However, there is a problem that manufacturing cost increases in order to provide the grease reservoir. Therefore, there has been desired an idea for satisfactorily suppressing an increase in manufacturing cost while improving the durability.

SUMMARY OF THE INVENTION

The invention provides a rolling bearing device that satisfies both durability and manufacturing cost requirements by providing a lubricant reservoir portion at part of a raceway groove.

An aspect of the invention provides a rolling bearing device. The rolling bearing device includes: an outer ring that has an outer ring raceway groove formed on an inner peripheral surface of the outer ring and a counter bore portion that is provided on an outer side of the outer ring raceway groove in an axial direction; an inner ring member that has an inner ring raceway groove formed on an outer peripheral surface of the inner ring member; and a plurality of rolling elements that are interposed between the outer ring raceway groove and the inner ring raceway groove so as to freely roll and that are in contact with the inner ring raceway groove of the inner ring member and the outer ring raceway groove of the outer ring at a predetermined contact angle, wherein a lubricant reservoir portion that stores lubricant is formed at an intermediate portion between the outer ring raceway groove and the counter bore portion.

With the above configuration, raceway surfaces with which the rolling elements substantially contact inside the counter bore portion may be reduced, and the lubricant reservoir portion may be arranged adjacent to the raceway surfaces. Thus, the amount of lubricant filled may be increased, and, in addition, lubricant stored in the lubricant reservoir portion easily spreads to the rolling elements. Furthermore, the lubricant reservoir portion does not require polishing. Therefore, it is possible to provide a rolling bearing device that satisfies both durability and manufacturing cost requirements.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
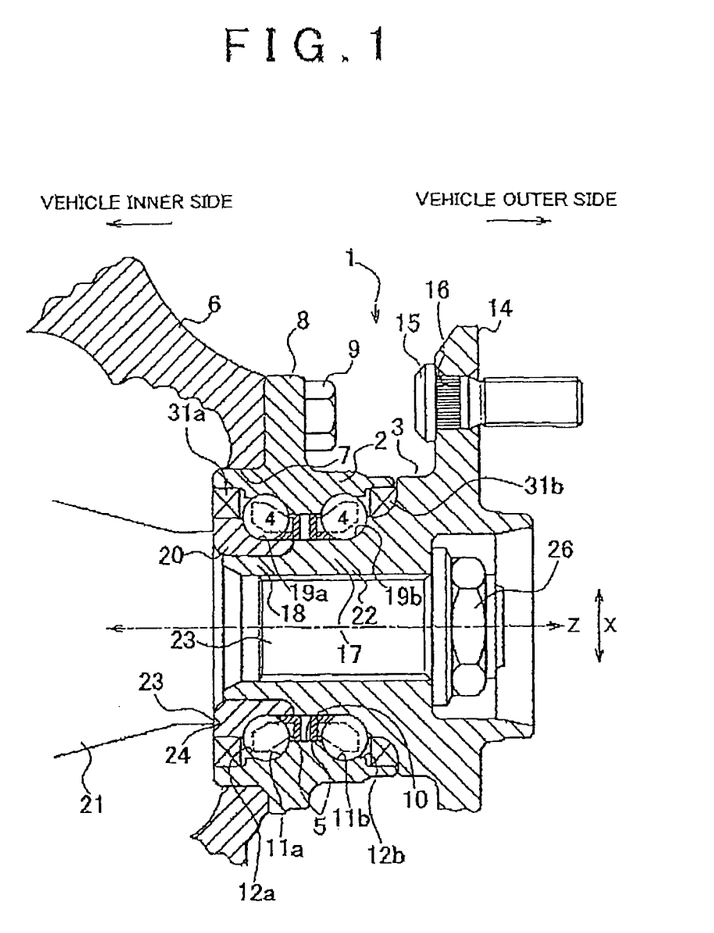
FIG. 1 is a cross-sectional view of an installed rolling bearing device according to an embodiment of the invention.

Hereinafter, an embodiment of the invention will be described with reference to a specific embodiment shown in the accompanying drawings. FIG. 1 is a cross-sectional view of an installed rolling bearing device according to the embodiment of the invention. As shown in FIG. 1, the rolling bearing device 1 (hub unit) includes an outer ring 2, an inner ring member 3 and rolling elements 4 so as to constitute a back-to-back double row angular contact ball bearing. The outer ring 2 serves as a fixed ring formed of bearing steel. The inner ring member 3 serves as a rotating ring. The rolling elements 4 formed of steel ball are interposed between the inner ring member 3 and the outer ring 2 and are arranged in double rows. A plurality of the rolling elements 4 are arranged in each row. In addition, the rolling elements 4 are retained by a retainer 5 at equiangular intervals in the circumferential direction so as to be able to freely roll between the outer ring 2 and the inner ring member 3.

The outer ring 2 is connected to a mounting port 7 of a vehicle fixed member 6, such as a vehicle inner side knuckle, axle housing, or the like, of a suspension in a vehicle. In this connection, a radially outer side of the outer ring 2 is inserted and fitted in the mounting port 7, and an outer ring flange portion 8 extending from the outer ring 2 outward in the radial direction X is fixed to a peripheral surface (vehicle outer side) of the mounting port 7 of the vehicle fixed member 6 via a bolt 9.

The inner peripheral surface of the outer ring 2 has parallel outer ring raceway grooves 11a and 11b so as to have a predetermined gap in the axial direction Z. The rolling elements 4 roll along the outer ring raceway grooves 11a and 11b. The outer ring raceway grooves 11a and 11b are formed in a circular arc shape with a curvature radius that is slightly larger than the curvature radius of each rolling element 4. An outer ring-side shoulder portion 10 is formed between the outer ring raceway groove 11a and the outer ring raceway groove 11b. The outer ring-side shoulder portion 10 protrudes inward in the radial direction X to have a reduced diameter. In addition, counter bore portions 12a and 12b are provided respectively on the outer sides of the both outer ring raceway grooves 11a and 11b in the axial direction Z. The inside diameter of each of the counter bore portions 12a and 12b is larger than the inside diameter of the outer ring-side shoulder portion 10 in order to use the counter bore portions 12a and 12b in a process in which the plurality of rolling elements 4 retained by the retainer 5 are assembled into the outer ring raceway grooves 11a and 11b.

Figure 3A:
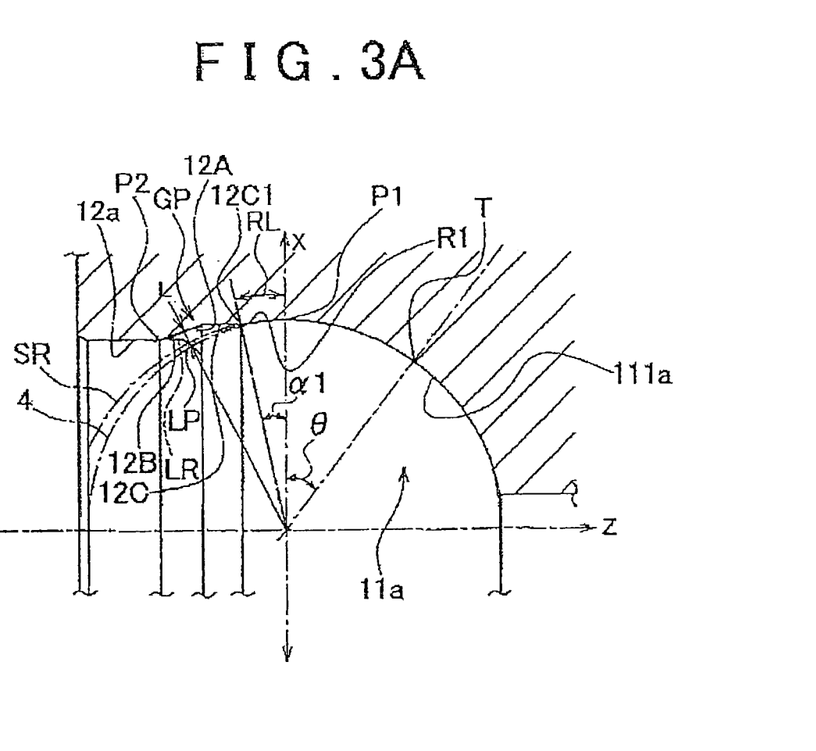
FIG. 3A is a partially enlarged view of FIG. 2.
Figure 3B:
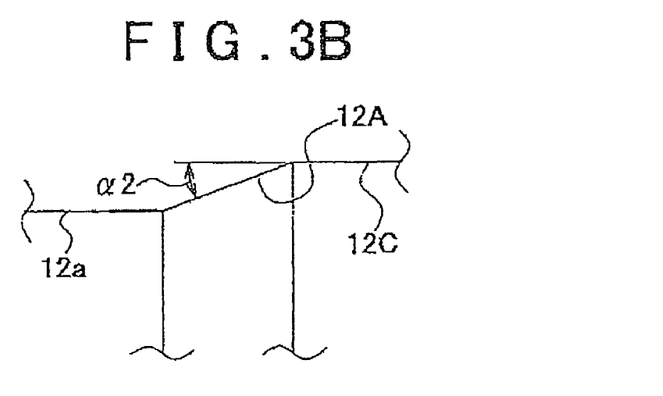
FIG. 3B is a partially enlarged view of FIG. 3A.

Then, as shown in FIG. 3A and FIG. 3B, when the rolling elements 4 that are retained by the retainer 5 in a loose fit manner at equiangular intervals in the circumferential direction are assembled from the outer side in the axial direction Z (left side in FIG. 3A and FIG. 3B) into the outer ring raceway groove 11a, the counter bore portion 12a restricts the rolling elements 4 from coining of outward in the axial direction Z. A wall surface 12A that is an intermediate portion located adjacent to the outer ring raceway groove 11a (right side in FIG. 3A and FIG. 3B) of the counter bore portion 12a, that is, between the counter bore portion 12a and the outer ring raceway groove 11a, is formed to expand its diameter so as to form a predetermined gap from the rolling surface of each rolling element 4 that contacts with the outer ring raceway groove 11a at a predetermined contact pressure.

When a point located at the outermost side (upper side in FIG. 3A and FIG. 3B) of the outer ring raceway groove 11a in the radial direction X is referred to as a connecting point P1, the outer ring raceway groove 11a for forming the gap has a circular arc raceway surface 111a that extends from the connecting point P1 in the axial direction Z and that includes a contact portion T with which the rolling elements 4 contact.

In addition, a terminal point P2 is located closer to the counter bore portion 12a than the connecting point P1 and is located inward in the radial direction X with respect to the connecting point P1. An intermediate portion between the terminal point P2 and the connecting point P1 is formed as the wall surface 12A.

Then, the wall surface 12A has a circular arc surface R1, a cylindrical surface portion 12C and a tapered surface portion 12B from the connecting point P1 outward in the axial direction Z toward the terminal point P2. Hereinafter, the circular arc surface R1, the cylindrical surface portion 12C and the tapered surface portion 12B will be described in detail.

The circular arc surface R1 having a predetermined circular arc length RL is formed continuously from the connecting point P1 outward in the axial direction Z (left side in FIG. 3A and FIG. 3B). The circular arc surface R1 has the same center of curvature as the center of curvature of the raceway surface 111a. The circular arc surface R1 serves as a restricting surface that restricts the rolling elements 4 that are retained by the retainer 5 in a loose fit manner and that are not in contact with the outer ring raceway groove 11a at a predetermined contact pressure from coming off outward in the axial direction Z (counter bore portion 12a side). Then, an imaginary reference circular arc surface SR that is extended from an end at the outer side of the circular arc surface R1 in the axial direction Z outward in the axial direction Z and that has the same center of curvature as the center of curvature of the circular arc surface R1 and an imaginary cylindrical surface LR that is extended from an end at the inner side of the counter bore portion 12a in the axial direction Z inward in the axial direction Z are assumed. Then, a predetermined gap L is formed between the reference circular arc surface SR and imaginary cylindrical surface LR and the wall surface 12A and cylindrical surface portion 12C that face the surfaces SR and LR in the radial direction X, and the gap L serves as a lubricant reservoir portion GP in which grease serving as lubricant is stored.

In addition, an angle α1 within which the circular arc surface R1 is formed desirably ranges from 0 degrees to 15 degrees (see FIG. 3A). This is because, when the angle α1 is smaller than 0 degrees, a contact ellipse (contact point between the raceway surface 111a and the rolling surface of each rolling element 4) runs on an edge portion 12C1 of the cylindrical surface portion 12C, which will be described later, (shoulder overriding), and there is a possibility that the service life becomes short contrarily. Therefore, the circular arc surface R1 is formed continuously (at 0 degrees) from the connecting point P1 to eliminate the possibility of shoulder overriding.

In addition, when the angle α1 exceeds 15 degrees and, particularly, becomes 20 degrees or above, the volume of the lubricant reservoir portion GP reduces, and the lubricant reservoir portion GP is distanced away from the rolling surface of each rolling element 4. Thus, the effect of measures for exhaustion of grease is reduced.

In addition, as described above, when the curvature radius of the reference circular arc surface SR is equal to the curvature radius of the outer ring raceway groove 11a, the diameter of each rolling element 4 is "BD" and the curvature radius of the outer ring raceway groove 11a is "OR", the relationship between "BD" and "OR" is desirably "0.5×BD<OR<0.53× BD".

The wall surface 12A that forms the lubricant reservoir portion GP may be formed by cutting using a cutter, such as a so-called tool, and is a non-polished surface without polishing. In addition, the raceway surface 111a of the outer ring raceway groove 11a and the circular arc surface R1 are polished surfaces by polishing in order to make the rolling elements 4 scratch-proof when the raceway surface 111a and the rolling elements 4 contact with each other at a predetermined contact pressure or when the circular arc surface R1 and the rolling elements 4 contact with each other so as to restrict the rolling elements 4 from coming off outward in the axial direction Z. Note that the non-polished surface has a surface roughness that is higher than that of the polished surface.

In addition, an inclined angle α2 of the tapered surface portion 12B, which will be described later, desirably ranges from 25 degrees to 35 degrees with the center of that angle at the intersection of the cylindrical surface portion 12C and the tapered surface portion 12B (see FIG. 3B). This is because the grease retention is better when the inclined angle α2 is larger than or equal to 40 degrees (because a bag shape may be formed between the adjacent rolling elements 4); however, when the outer ring 2 is bored, it is impossible to continuously machine the raceway surface 111a, the circular arc surface R1, the cylindrical surface portion 12C, the tapered surface portion 12B and the counter bore portion 12a in the stated order using a bore cutting tool (brazing tool, solid tool, throw away tool, or the like) that serves as a tool. The bore cutting tool has a form such that a cutting edge protrudes when the inclined angle α2 is large. Therefore, the tapered surface portion 12B interferes with portions other than the cutting edge of a cutting chip, the head of a tool to which the cutting chip is mounted, or the like, when the bore cutting tool is, for example, a throw away tool. For this reason, the inclined angle α2 is set so that continuous machining may be substantially performed in the above described order and no interference with a tool occurs.

In addition, when the inclined angle α2 is too small, grease is easily drained. Thus, the inclined angle α2 that give a reasonable and effective shape is desirably about 30 degrees.

In addition, the distance L between the reference circular arc surface SR and the tapered surface portion 12B is desirably smaller than or equal to 15 mm (see FIG. 3A). A specific example of the distance L is a distance between the tapered surface portion 12B and a contact point LP of the reference circular arc surface SR and the imaginary cylindrical surface LR on a line that passes through both the center of a selected reference circular arc surface SR and the contact point LP.

This is to improve grease retention and grease supply (because grease is hard to be drained, and grease is retained near the rolling elements 4 or the raceway surface 111a). Note that it is not desirable that the distance L is smaller than or equal to 0 mm because there is a possibility that interference with the rolling elements 4 occurs. Note that grease retained in the lubricant reservoir portion GP may run off outside the region surrounded by the above described reference circular arc surface SR, imaginary cylindrical surface LR, wall surface 12A and cylindrical surface portion 12C.

In addition, a specific example of a form of the wall surface 12A of the lubricant reservoir portion GP is formed to have the tapered surface portion 12B and the cylindrical surface portion 12C. The tapered surface portion 12B has a reduced diameter form continuous from the terminal point P2 of the wall surface 12A. The cylindrical surface portion 12C is continuous from an end of the tapered surface portion 12B in the axial direction Z. Note that the cylindrical surface portion 12C is continuous with the circular arc surface R1. With the above configuration, as it goes outward in the radial direction X and inward in the axial direction Z (right side in FIG. 3A and FIG. 3B), the gap L from the rolling elements 4 may be gradually reduced. Thus, lubricant easily spreads toward the rolling elements 4, so lubricating function becomes favorable.

Note that a wall surface having the same shape as the wall surface 12A is also formed on the vehicle outer side of the outer ring 2; however, the wall surface formed on the vehicle outer side and the wall surface 12A formed on the vehicle inner side are, of course, bilaterally symmetrical.

In addition, the inner ring member 3 is integrally formed with a disk-shaped hub flange 14 that protrudes outward in the radial direction X. A hub bolt 15 is fixed to the hub flange 14. The hub bolt 15 is used to mount the hub flange 14 so as to be connected to a wheel (not shown) on the vehicle outer side. The hub bolt 15 is fixedly press-fitted into a bolt fitting hole 16 of the hub flange 14.

The hub flange 14 is integrally formed on an outer periphery of one end (vehicle outer side) of a shaft portion 17 that constitutes part of the inner ring member 3 so as to protrude outward in the radial direction. In addition, a small-diameter portion 18 having a further small outside diameter is formed at the other end (vehicle inner side (left side in FIG. 1)) of the shaft portion 17. An inner ring 20 is fixedly press-fitted into the small-diameter portion 18. The inner ring 20 is separately formed from the small-diameter portion 18. The inner ring 20 has an inner ring raceway groove 19a on its outer peripheral surface. One of sets of the rolling elements 4 arranged in a plurality of rows roll on the inner ring raceway groove 19a. In addition, an inner ring raceway groove 19b is formed on an outer peripheral surface between the one end and the other end of the shaft portion 17. The other one of sets of the rolling elements arranged in a plurality of rows roll on the inner ring raceway groove 19b. In this way, the inner ring 20 is press-fitted to the other end of the shaft portion 17 to be integrated. Thus, the inner ring member 3 having the hub flange 14 at one end is formed. Note that the inner ring raceway grooves 19a and 19b are also formed in a circular arc shape with a curvature radius that is slightly larger than the curvature radius of each rolling element 4, as in the case of the outer ring raceway grooves 11a and 11b of the outer ring 2.

The shaft portion 17 of the inner ring member 3 has a coupling insertion hole 22 that serves as a spline hole. A drive shaft 21 that transmits power is spline-coupled to the coupling insertion hole 22. A spline shaft 23 of the drive shaft 21 is inserted into the coupling insertion hole 22 so that power is transmittable. Then, a nut 26 that serves as a screw fastener is screwed to fix an end surface 24 of the drive shaft 21 to an extended side end of the drive shaft 21 so that the end surface 24 is in contact with a vehicle inner side inner ring end surface 25 of the inner ring 20, facing the end surface 24.

In this way, a predetermined load is applied in the axial direction Z to bring the rolling surface of each rolling element 4 retained by the retainer 5 into contact with the outer ring raceway grooves 11a and 11b and the inner ring raceway grooves 19a and 19b at a predetermined contact angle θ (see FIG. 3A and FIG. 3B) with respect to the radial direction X. Thus, an appropriate predetermined contact pressure is preloaded on those contact portions.

Figure 4:
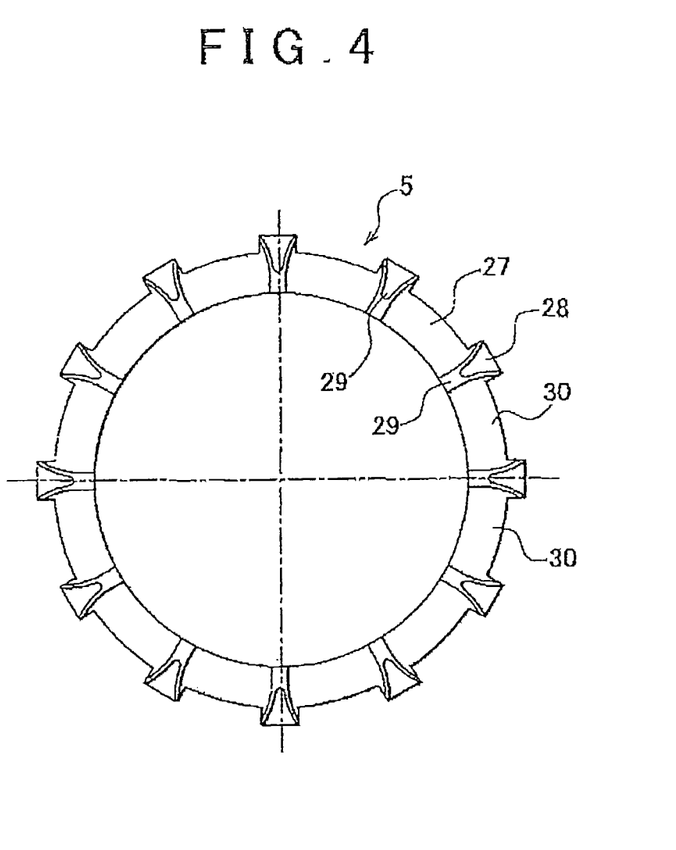
FIG. 4 is a front view of a retainer of the rolling bearing device according to the embodiment of the invention.
Figure 5:
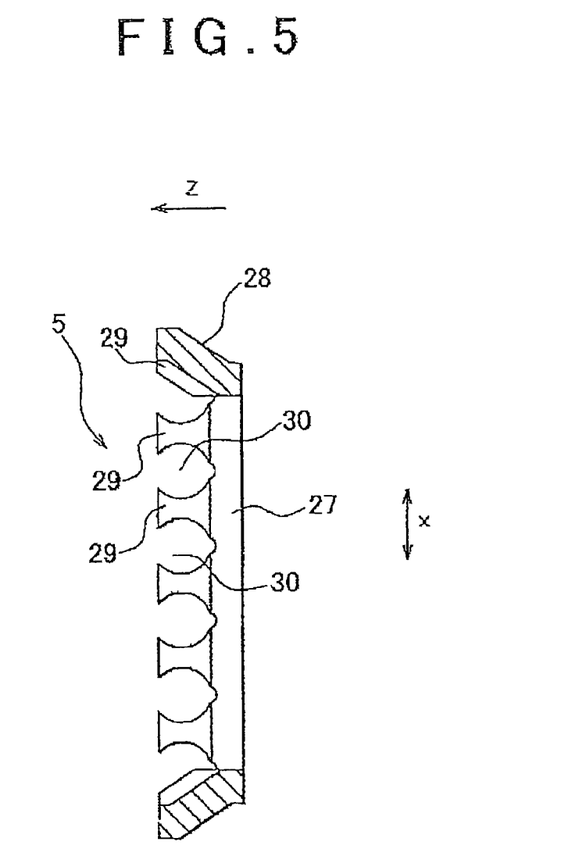
FIG. 5 is a cross-sectional view of the retainer of the rolling bearing device according to the embodiment of the invention.

In addition, as shown in FIG. 4 and FIG. 5, the retainer 5 that retains the rolling elements 4 in a loose fit manner has an annular ring-shaped portion 27 that is placed in the space between the outer ring 2 and the inner ring member 3, and taper portions 28 are integrally formed with an end of the ring-shaped portion 27. Each taper portion 28 increases its diameter in the radial direction X as it protrudes in the axial direction Z. The taper portions 28 are formed to protrude so as to apply appropriate elasticity to a pair of retaining pawls 29 that face in the circumferential direction at constant intervals. The retaining pawls 29 are curved toward the adjacent retaining pawls 29. The retaining pawls 29 form concave spherical pocket portions 30 between the pairs of retaining pawls 29 and the ring-shaped portion 27. Each pocket portion 30 has a curvature radius that is slightly larger than the curvature radius of each rolling element 4.

Then, the retaining pawls 29 are elastically deformed to mount the rolling elements 4, and the rolling elements 4 are retained via predetermined pocket gaps. Thus, the retainer 5 forms a snap-on type crown-shaped retainer. By so doing, the rolling elements 4 may be retained so as not to come off.

Here, it is only necessary to provide elasticity for the retaining pawls 29 of the retainer 5. A metal material or a resin material may be used for the retaining pawls 29. An example of the resin material includes polyimide resin, polybutylene terephthalate, polyphenylene sulfide (PPS), polyimide-imide (PAI), thermoplastic polyimide, polyether ether ketone (PEEK), polyether nitrile (PEN), or the like.

When the hub unit is assembled, the rolling elements 4 are assembled to the pocket portions 30 of the retainer 5 to form a subassembly in advance, and the subassembly is assembled from an outer side of the outer ring 2 in the axial direction Z (counter bore portions 12a and 12b side) into the outer ring raceway grooves 11a and 11b. In this assembling process, the retaining pawls 29 of the retainer 5 have elasticity. Therefore, when the rolling elements 4 run over the counter bore portion 12a (terminal point P2 of the wall surface 12A) shown in FIG. 2, the retaining pawls 29 elastically reduce their diameters (inward in the radial direction X) to allow the rolling elements 4 to be assembled into the outer ring raceway groove 11a. After that, the retaining pawls 29 elastically return to a neutral state (free state) before elastic deformation, and the rolling elements 4 retained in that state are retained in a loose fit manner.

In this way, in the assembling process thereafter, for example, even when the outer ring 2 is arranged so that the counter bore portion 12a is positioned at the lower side, the rolling elements 4 are restricted by the restricting surface (the circular arc surface R1 or the wall surface 12A) of the counter bore portion 12a, and the subassembly that includes the mounted rolling elements 4 may be retained so that the subassembly does not come off from the outer ring raceway groove 11a.

Note that, in order to hermetically seal a gap between the inner ring member 3 and outer ring 2 of the rolling bearing device 1 from the outside, sealing devices 31a and 31b are arranged respectively at the vehicle outer side (right side in FIG. 1) and the vehicle inner side (left side in FIG. 1), and both the sealing devices 31a and 31b restrict leakage of grease.

Figure 2:
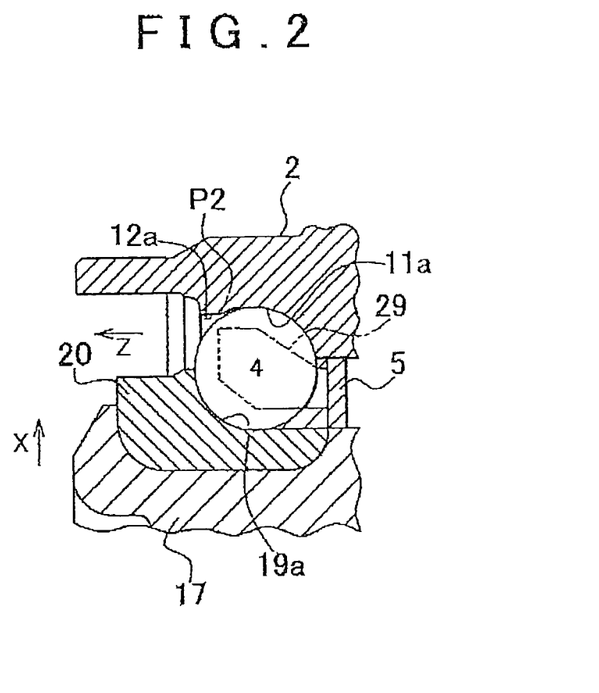
FIG. 2 is a partially cross-sectional view of the rolling bearing device according to the embodiment of the invention.

In addition, the above embodiment is the rolling bearing device 1 for a drive wheel. However, when no coupling insertion hole 22 is formed in the shaft portion 17 as shown in FIG. 2, the rolling bearing device 1 may be used for a driven wheel in such a manner that the other end of the shaft portion 17 is extended to the outside, the other end is plastically deformed outward in the radial direction X so as to be calked to form a calked portion, and then the inner ring 20 is fixed so as not to come off in the axial direction Z.

Next, a method of assembling a rolling bearing device will be described. First, the rolling elements 4 are retained by the retaining pawls 29 of the retainer 5 to form a subassembly. Two sets of the subassembly are prepared respectively for the vehicle inner side and the vehicle outer side. Two sets of the subassembly are respectively inserted from both ends of the outer ring 2 in the axial direction Z (counter bore portions 12a and 12b side) to assemble the rolling elements 4 into the outer ring raceway grooves 11a and 11b. After that, the shaft portion 17 of the inner ring member 3 is inserted from the vehicle outer side into an assembly of the outer ring 2 and two sets of subassembly, and then the inner ring 20 is inserted from the vehicle inner side into the small-diameter portion 18. By so doing, the rolling elements 4 retained by the retainer 5 are assembled between the outer ring raceway grooves 11a and 11b of the outer ring 2 and the inner ring raceway grooves 19a and 19b of the inner ring member 3. Furthermore, when the rolling bearing device 1 is used for a drive wheel, the drive shaft 21 is fastened. When the rolling bearing device 1 is used for a driven wheel, the inner ring 20 is calked. By so doing, the rolling bearing device 1 is assembled so as to apply a preload on the rolling elements 4 so that the rolling elements 4 are in contact with the outer ring raceway grooves 11a and 11b of the outer ring 2 and the inner ring raceway grooves 19a and 19b at a predetermined contact pressure. After that, grease is supplied from the counter bore portion 12a side located on the vehicle inner side to fill grease into the space between the outer ring 2 and the inner ring member 3. By filling the grease, grease is also stored in the lubricant reservoir portion GP and, particularly, the amount of grease stored may be increased at a portion adjacent to each rolling element 4. Thus, it is useful for exhaustion of grease. In addition, grease may be filled into the lubricant reservoir portion GP in a temporal assembly such that the rolling elements 4 of the subassembly are assembled into the outer ring raceway grooves 11a and 11b of the outer ring 2.

The rolling bearing device according to the embodiment of the invention includes: an outer ring that has an outer ring raceway groove that is formed on an inner peripheral surface of the outer ring and a counter bore portion that is provided on an outer side of the outer ring raceway groove in an axial direction; an inner ring member that has an inner ring raceway groove that is formed on an outer peripheral surface of the inner ring member; and a plurality of rolling elements that are interposed between the outer ring raceway groove and the inner ring raceway groove so as to freely roll and that are in contact with the inner ring raceway groove of the inner ring member and the outer ring raceway groove of the outer ring at a predetermined contact angle, wherein a lubricant reservoir portion that stores lubricant is formed at an intermediate portion between the outer ring raceway groove and the counter bore portion.

With the above configuration, raceway surfaces with which the rolling elements substantially contact on the inner side of the counter bore portion may be reduced, and the lubricant reservoir portion may be arranged adjacent to the raceway surfaces. Thus, the amount of lubricant filled may be increased, and, in addition, lubricant stored in the lubricant reservoir portion easily spreads to the rolling elements. Furthermore, the lubricant reservoir portion does not require polishing. Therefore, it is possible to provide a rolling bearing device that satisfies both durability and manufacturing cost requirements.

In addition, the lubricant reservoir portion is formed by increasing the diameter of the intermediate portion between the outer ring raceway groove and the counter bore portion outward in the radial direction.

The outer ring raceway groove has a circular arc raceway surface that includes a contact portion with which the rolling elements contact, the raceway surface is extended outward in the axial direction to form an imaginary circular arc surface that has the same center of curvature as the center of curvature of the raceway surface as an imaginary reference circular arc surface, the counter bore portion is extended toward an inner side in the axial direction to imaginarily form a cylindrical surface as an imaginary cylindrical surface, and the lubricant reservoir portion is formed by increasing the diameter of the intermediate portion in the radial direction with respect to the imaginary reference circular arc surface and the imaginary cylindrical surface. With the above configuration, it is possible to further improve grease retention and grease supply.

In the rolling bearing device according to the embodiment of the invention, the rolling elements are inserted from an outer side in the axial direction into the outer ring raceway groove in a state where the rolling elements are respectively retained by pocket portions that are provided for an annular retainer in a circumferential direction of the retainer, the retainer is elastically reduced in diameter in the radial direction when the rolling elements run over the counter bore portion, the retainer elastically returns after the rolling elements run over the counter bore portion to assemble the rolling elements into the outer ring raceway groove. By so doing, the rolling elements assembled into the outer ring raceway groove may be prevented by the counter bore portion from coming off even when the outer ring is in any positions in an assembling process thereafter. In addition, in this subassembly state, it is possible to reliably store lubricant in the lubricant reservoir portion, and it is possible to smoothly fill lubricant into the lubricant reservoir portion.

In the rolling bearing device according to the embodiment of the invention, a raceway surface that includes a contact portion of the outer ring raceway groove, with which the rolling elements contact, is a polished surface, and the lubricant reservoir portion has a non-polished surface having a surface roughness that is higher than that of the raceway surface. Thus, a range in which the outer ring raceway groove is polished may be reduced. Therefore, because polishing of the lubricant reservoir portion is not required, it is possible to reduce cost of removal process. In addition, it is also possible to configure a hub unit in which the inner ring member is connected to a tire wheel and the outer ring is connected to a vehicle fixed member of a vehicle. Thus, it is possible to provide a rolling bearing device as a unit. In addition, the shape of the inner peripheral surface of the lubricant reservoir portion may have a tapered surface portion that is continuous from the terminal point of the wall surface and that has a reduced diameter and a cylindrical surface portion that is continuous from an end of the tapered surface portion in the axial direction. By so doing, the lubricant reservoir portion may be formed of a forged surface directly or may be formed using low-cost cutting process.

The invention claimed is:

1. A rolling bearing device comprising:
an outer ring having an outer ring raceway groove formed on an inner peripheral surface of the outer ring and a counter bore portion provided on an outer side of the outer ring raceway groove in an axial direction, the outer ring raceway groove having a circular arc surface formed from a connecting point to an edge portion, the circular arc surface having an angle between 0° and 15°;
an inner ring member having an inner ring raceway groove formed on an outer peripheral surface of the inner ring member; and
a plurality of rolling elements interposed between the outer ring raceway groove and the inner ring raceway groove so as to freely roll and contact the inner ring raceway groove and the outer ring raceway groove at a predetermined contact angle; and
a lubricant reservoir portion configured to store lubricant and is formed at an intermediate portion between the outer ring raceway groove and the counter bore portion, wherein
the lubricant reservoir includes: (1) a tapered surface portion having a greater diameter than the counter bore portion, and the tapered surface portion being continuous from the edge portion to a terminal point of a wall surface of the outer ring, and (2) a cylindrical surface portion that is continuous from an end of the tapered surface portion in the axial direction.

2. The rolling bearing device according to claim 1, wherein the lubricant reservoir portion is formed by increasing a diameter of the intermediate portion outward in a radial direction.

3. The rolling bearing device according to claim 1, wherein
the outer ring raceway groove has a circular arc raceway surface that includes a contact portion with which the rolling elements contact,
the circular arc raceway surface is extended outward in the axial direction to form a circular arc surface that has the same center of curvature as an imaginary reference circular arc surface,
the counter bore portion is extended toward an inner side in the axial direction to imaginarily form a cylindrical surface as an imaginary cylindrical surface, and
the lubricant reservoir portion is formed by increasing the diameter of the intermediate portion in a radial direction with respect to the imaginary reference circular arc surface and the imaginary cylindrical surface.

4. The rolling bearing device according to claim 1, wherein
a raceway surface that includes a contact portion of the outer ring raceway groove, with which the rolling elements contact is a polished surface, and the lubricant reservoir portion has a non-polished surface having a surface roughness that is higher than that of the raceway surface.

* * * * *